(12) United States Patent
Sankruthi

(10) Patent No.: US 8,448,243 B1
(45) Date of Patent: May 21, 2013

(54) SYSTEMS AND METHODS FOR DETECTING UNKNOWN MALWARE IN AN EXECUTABLE FILE

(75) Inventor: Anand Sankruthi, Chennai (IN)

(73) Assignee: Symantec Corporation, Mountain View, CA (US)

( * ) Notice: Subject to any disclaimer, the term of this patent is extended or adjusted under 35 U.S.C. 154(b) by 829 days.

(21) Appl. No.: 12/579,133

(22) Filed: Oct. 14, 2009

(51) Int. Cl.
*G06F 12/14* (2006.01)

(52) U.S. Cl.
USPC ........... 726/22; 726/23; 726/24; 726/25; 726/26; 726/27; 713/187; 713/188

(58) Field of Classification Search
None
See application file for complete search history.

(56) References Cited

U.S. PATENT DOCUMENTS

| | | | |
|---|---|---|---|
| 7,882,561 B2 * | 2/2011 | Costea et al. | 726/24 |
| 2006/0095971 A1 * | 5/2006 | Costea et al. | 726/26 |

OTHER PUBLICATIONS

EICAR; The Anti-Virus or Anti-Malware Test File; http://www.eicar.org/anti_virus_test_filt.htm; Taken from site on Aug. 13, 2009.
EICAR; The Anti-Virus or Anti-Malware Test File; http://web.archive.org/web/20081231022142/http://www.eicar.org/anti_virus_test_file.htm, as accessed on Aug. 12, 2009.

* cited by examiner

*Primary Examiner* — Pramila Parthasarathy
(74) *Attorney, Agent, or Firm* — ALG Intellectual Property, LLC

(57) ABSTRACT

A computer-implemented method may include generating a first region-of-interest identifier that represents a region of interest within an executable file at a first time. The computer-implemented method may also include receiving, at a second time, a request to scan the executable file for malware and generating a second region-of-interest identifier that represents the region of interest within the executable file at the second time. The computer-implemented method may further include comparing the first and second region-of-interest identifiers to determine that the region of interest at the second time is different than the region of interest at the first time. In addition, the computer-implemented method may include using the difference between the region of interest at the first and second times to determine whether the executable file comprises malware. Various other systems, methods, and computer-readable media are also disclosed.

20 Claims, 6 Drawing Sheets

SYSTEMS AND METHODS FOR DETECTING UNKNOWN MALWARE IN AN EXECUTABLE FILE

BACKGROUND

Malicious software, also referred to as malware, may infiltrate computing devices and threaten the privacy of consumers. Malware programmers often program malware capable of embedding itself within legitimate software programs. Malware programmers may want to infect legitimate software without rendering the legitimate software inoperable. Thus, malware may be inserted into legitimate software in a manner that leaves the legitimate software operable. For example, malware may append a virus to the end of a word-processing program's executable file.

In an effort to combat malware, consumers may deploy anti-malware solutions that detect and remove infected files from computing devices. Some anti-malware solutions rely on malware signatures to identify infected files. Although anti-malware solutions may identify infected files without using malware signatures, such solutions may not be accurate or efficient. What is needed, therefore, is a mechanism that efficiently and effectively detects unknown malware for which a malware signature is not available.

SUMMARY

As will be described in greater detail below, the instant disclosure generally relates to systems and methods for detecting unknown malware in an executable file. More specifically, the systems and methods disclosed herein may enable a computing device to discover malware by determining that a region of interest (e.g., a region known to be targeted by malware) within an executable file has been modified.

In certain embodiments, a method for detecting unknown malware in an executable file may include generating a first region-of-interest identifier that represents a region of interest within the executable file at a first time. For example, during a first scan on a computing device, an identifier module may calculate a first region-of-interest hash that represents the region of interest within the executable file at the first time. The region of interest may include one or more regions, such as a beginning region and/or an end region, where malware is most likely to infect the executable file. The identifier module may store the first region-of-interest identifier as metadata of the executable file, thereby enabling the first region-of-interest identifier to be retrieved for comparison with a second region-of-interest identifier at a second time.

After the first region-of-interest identifier has been stored, a malware-detection module may, at a second time, receive a request to scan the executable file for malware. The identifier module may then generate a second region-of-interest identifier that represents the region of interest at the second time. For example, during a second scan on a computing device, the identifier module may calculate a second region-of-interest hash that represents the region of interest within the executable file at the second time.

The malware-detection module may compare the first and second region-of-interest identifiers to determine that the region of interest at the second time is different than the region of interest at the first time. To compare the first and second region-of-interest identifiers, the malware-detection module may perform a binary differential on the first and second region-of-interest identifiers. Based on a result of the binary differential, the malware-detection module may determine that the region of interest at the second time includes at least one executable instruction that has been modified since the first time or was not included in the region of interest at the first time.

The malware-detection module may use the difference between the region of interest at the first and second times to determine whether the executable file includes malware. For example, the malware-detection module may determine whether a middle region of the executable file has been modified, in addition to the region of interest, since the first time. To determine whether the middle region has been modified, the identifier module may generate a first mid-region identifier that represents the middle region of the executable file at the first time. The identifier module may also store the first mid-region identifier as metadata of the executable file, thereby enabling the first mid-region identifier to be retrieved for comparison with a second mid-region identifier at a second time.

After the malware-detection module has determined that the region of interest has been modified since the first time, the identifier module may generate a second mid-region identifier that represents the middle region of the executable file at the second time. The malware-detection module may then compare the first and second mid-region identifiers to determine whether the middle region of the executable file has been modified since the first time. If the region of interest has been modified since the first time, but the middle region remains unmodified, the malware-detection module may determine that the executable file includes malware.

In some embodiments, the malware-detection module may determine whether the executable file includes malware by examining the region of interest at the second time. For example, the malware-detection module may determine whether an executable instruction in the region of interest at the second time is programmed to perform a suspicious action (e.g., a potentially-malicious action). More specifically, the malware-detection module may determine whether the beginning region of the executable file includes, at the second time, an executable instruction that directs the computing device to suspiciously jump to, and execute, an end region of the executable file.

If the executable file includes malware, the malware-detection module may perform one or more security actions with respect to the executable file. For example, the malware-detection module may lower a reputation of the executable file and/or notify a user that the executable file includes malware. In addition, the malware-detection module may, quarantine the executable file, delete the executable file, or cure the executable file by removing the malware.

In several embodiments, the identifier module may also generate a first file identifier that represents the executable file at the first time. After the request to scan the executable file for malware has been received, the identifier module may generate a second file identifier that represents the executable file at the second time. The malware-detection module may then compare the first and second file identifiers before comparing the first and second region-of-interest identifiers. By starting with the first and second file identifiers, the malware-detection module may determine, without comparing each individual region within the executable file, that at least a portion of the executable file has been modified since the first time.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
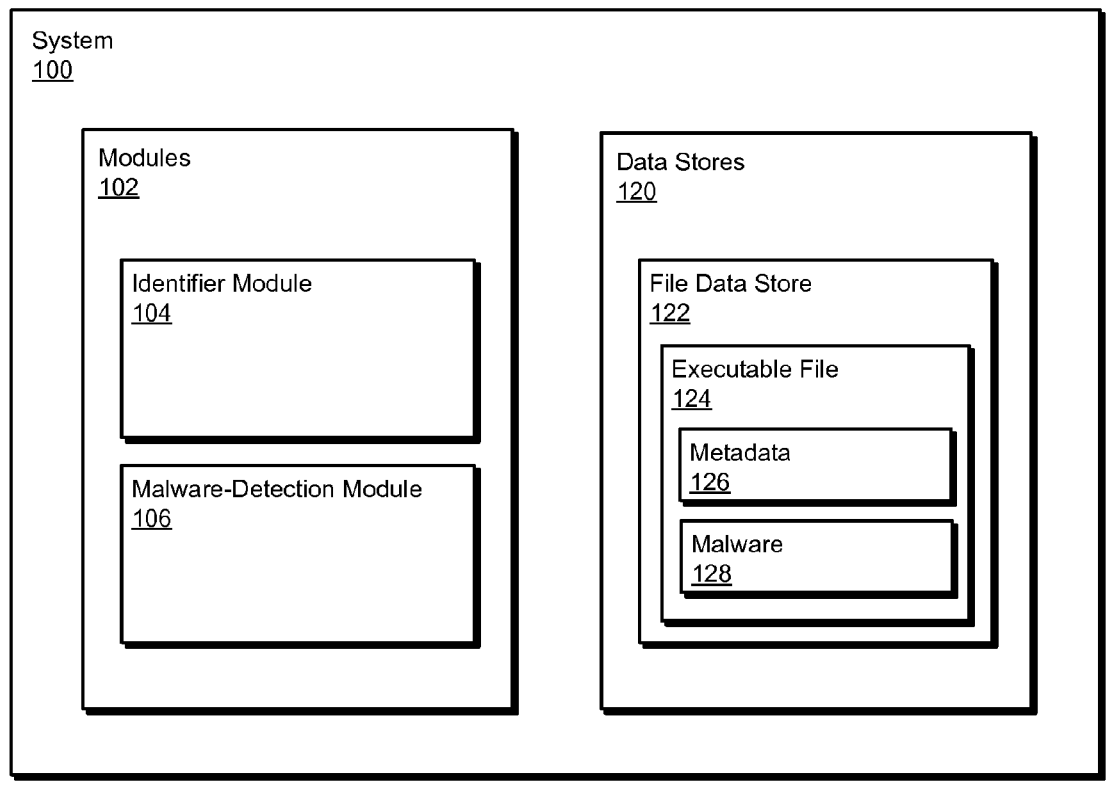
FIG. 1 is a block diagram of an exemplary system for detecting unknown malware in an executable file according to certain embodiments.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure generally relates to systems and methods for detecting unknown malware in an executable file. The systems and methods disclosed herein may enable a computing device to determine, by examining a region of interest within an executable file, whether the executable file has been modified as a result of malware insertion. These systems and methods may provide certain features and advantages that enable the computing device to detect malware without relying on malware signatures or any other dependencies external to the computing device. These and additional embodiments may also provide various other features and advantages.

The term "malware," as used herein, generally refers to any executable code that infiltrates a computing device without the informed consent of a user. Malware may also refer to any executable code that is created with malicious intent or for a malicious purpose. Examples of malware include, without limitation, computer viruses, computer worms, Trojan horses, spyware, adware, or any other malicious software program. In addition, the phrase "unknown malware," as used herein, generally refers to any malware for which a malware signature is unavailable or inaccessible.

The phrase "executable file," as used herein, generally refers to any computer file that may be executed by a computing device. More specifically, an executable file may include binary code that, when executed, directs a computing device to perform one or more tasks. An executable file may include any software program or application, such as MICROSOFT WORD, MOZILLA FIREFOX, and/or a variety of other software programs.

Figure 2:
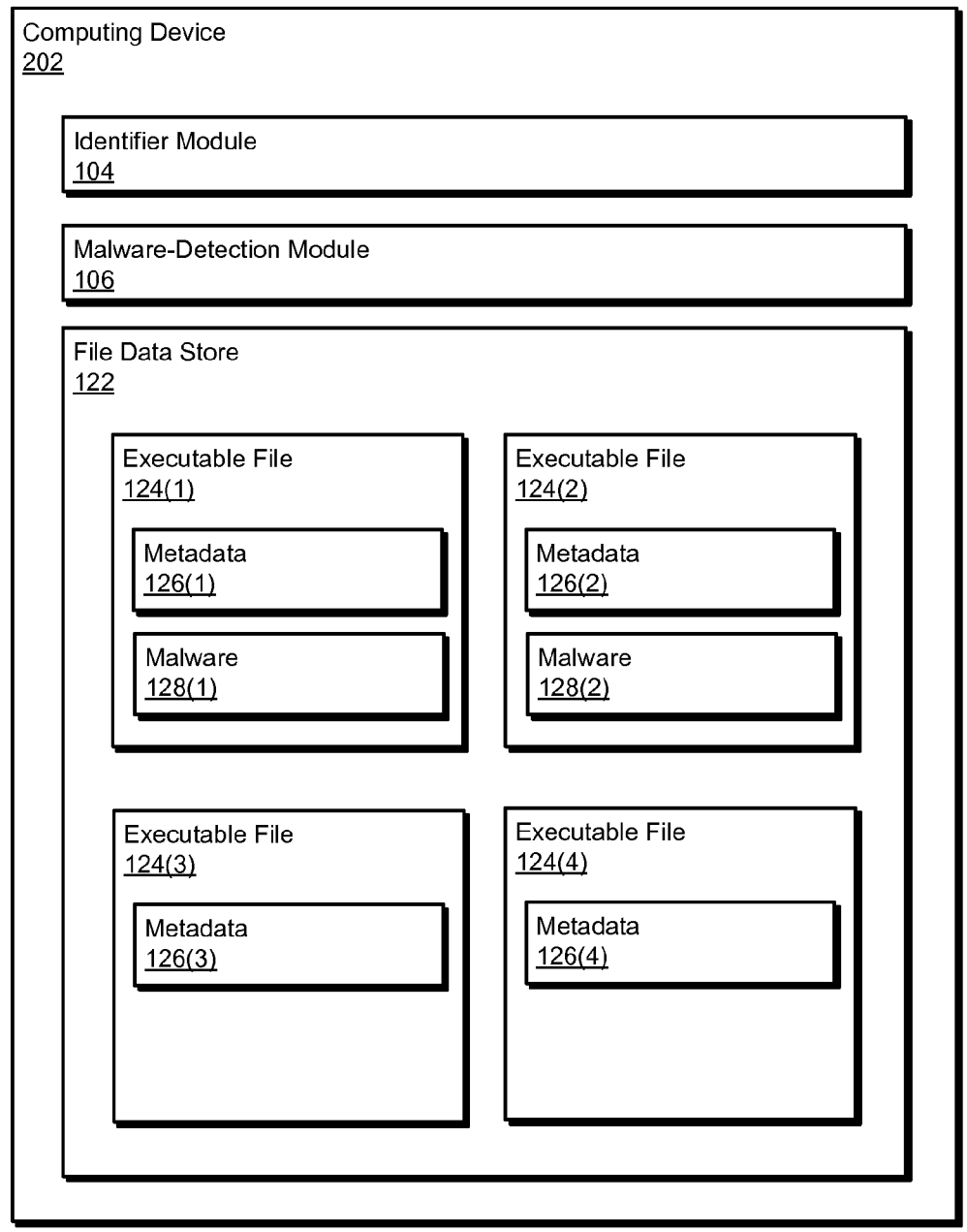
FIG. 2 is a block diagram of an exemplary system for detecting unknown malware in an executable file according to certain embodiments.

The following will provide, with reference to FIGS. 1-2, detailed descriptions of exemplary systems for detecting unknown malware in an executable file. Detailed descriptions of an exemplary executable file are presented in connection with FIG. 3. Detailed descriptions of corresponding computer-implemented methods will also be provided in connection with FIG. 4. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for detecting unknown malware in an executable file. As illustrated in this figure, exemplary system 100 may include one or more modules 102 for performing one or more tasks. For example, and as will be explained in greater detail below, exemplary system 100 may include an identifier module 104 programmed to generate region-of-interest, mid-region, and/or file identifiers that represent one or more regions within an executable file at a particular point in time.

In addition, and as will be described in greater detail below, exemplary system 100 may include a malware-detection module 106 programmed to compare region-of-interest, mid-region, and/or file identifiers to determine whether the executable file includes malware. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, as will be described in greater detail below, one or more of modules 102 may represent software modules stored and configured to run on one or more computing devices, such as the computing device 202 in FIG. 2, computing system 510 in FIG. 5, and/or portions of exemplary network architecture 600 in FIG. 6. One or more of modules 102 in FIG. 1 may also represent all or portions of one or more special-purpose computers configured to perform one or more tasks.

As illustrated in FIG. 1, exemplary system 100 may also include one or more data stores 120. Data stores 120 may represent portions of a single database or computing device or a plurality of databases or computing devices. In one embodiment, exemplary system 100 may include a file data store 122 for storing one or more computer files, such as an executable file 124. Executable file 124 may include, among other executable code, metadata 126 and malware 128.

Data stores 120 in FIG. 1 may represent a portion of one or more computing devices. For example, data stores 120 may represent a portion of computing device 202, computing system 510 in FIG. 5, and/or portions of exemplary network architecture 600 in FIG. 6. Alternatively, data stores 120 in FIG. 1 may represent one or more physically separate devices capable of being accessed by a computing device, such as computing system 510 in FIG. 5, and/or portions of exemplary network architecture 600 in FIG. 6.

Exemplary system 100 in FIG. 1 may be deployed in a variety of ways. For example, all or a portion of exemplary system 100 may represent portions of a cloud-computing or network-based environment, such as exemplary system 200 illustrated in FIG. 2. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

As shown in FIG. 2, exemplary system 200 may include a computing device 202, an identifier module 104, a malware-detection module 106, a file data store 122, executable files 124(1)-(4), metadata 126(1)-(4), and malware 128(1)-(2). In one embodiment, and as will be described in greater detail below, computing device 202 may be programmed to generate a first region-of-interest identifier that represents a region of interest within executable file 124(1) at a first time. Computing device 202 may also be programmed to receive, at a second time, a request to scan executable file 124(1) for malware.

In addition, computing device 202 may be programmed to generate a second region-of-interest identifier that represents the region of interest within executable file 124(1) at a second time. Computing device 202 may be programmed to compare the first and second region-of-interest identifiers to determine that the region of interest at the second time is different than the region of interest at the first time. In some embodiments, computing device 202 may be further programmed to use the difference between the region of interest at the first and second times to determine whether executable file 124(1) includes malware 128(1).

Computing device 202 generally represents any type or form of computing device capable of reading computer-executable instructions. Examples of computing device 202 include, without limitation, laptops, desktops, servers, cellular phones, personal digital assistants (PDAs), multimedia players, embedded systems, combinations of one or more of the same, exemplary computing system 510 in FIG. 5, or any other suitable computing device. One or more of modules 102 in FIG. 1 may be configured to detect unknown malware on computing device 202. In certain embodiments, such modules may be located remote from computing device 202.

Figure 3:
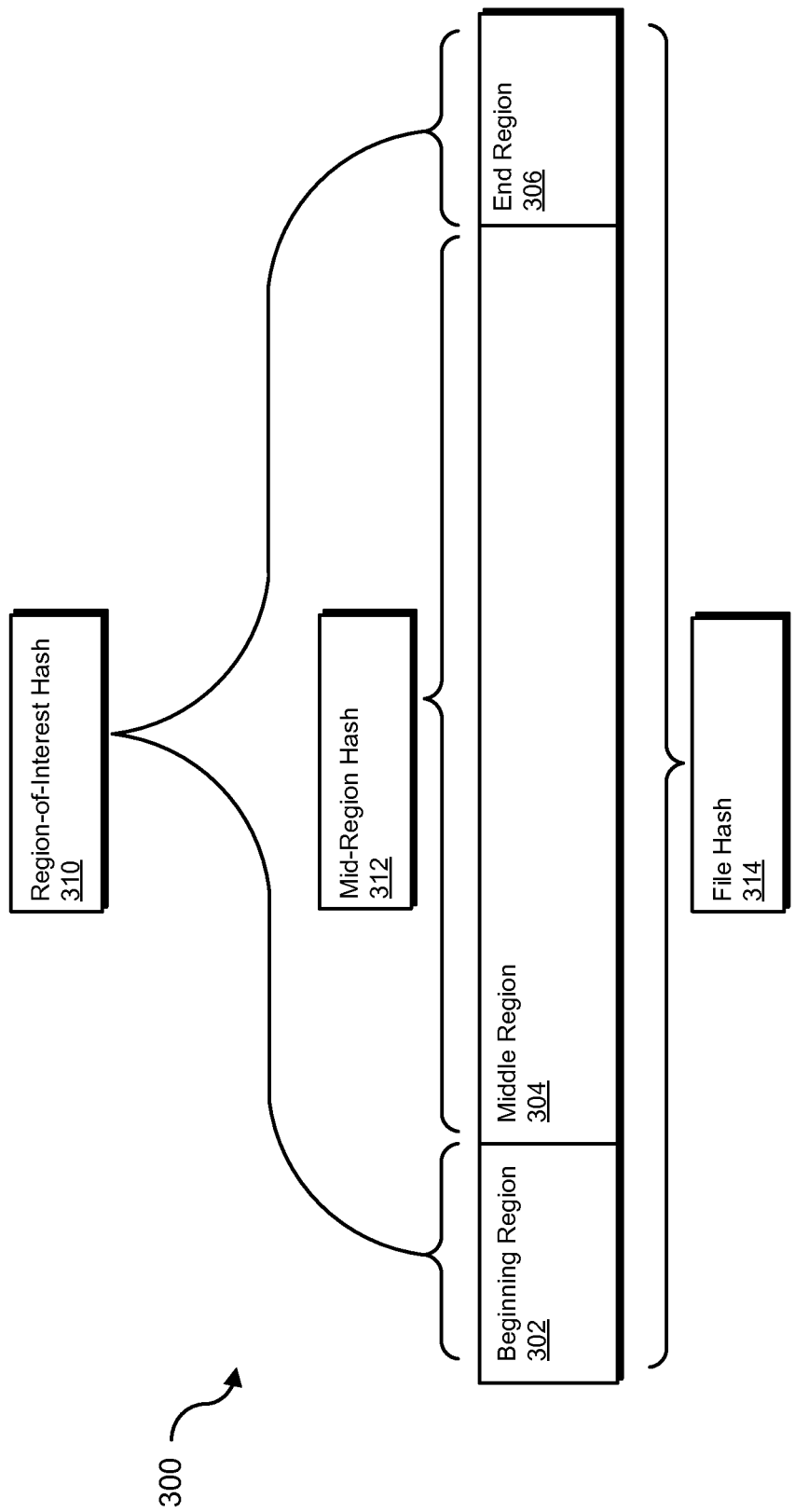
FIG. 3 is a block diagram of an exemplary executable file and corresponding hashes according to certain embodiments.

FIG. 3 is a block diagram of an exemplary executable file 300 and corresponding hashes. In various embodiments, an executable file may include a beginning region 302, a middle region 304, and an end region 306. A file hash 314 may represent beginning region 302, middle region 304, and end region 306 at a particular point in time. Each of beginning region 302, middle region 304, and end region 306 may represent a specific region of binary code within the executable file.

A region-of-interest hash 310 may represent a region of interest within the executable file at a particular point in time. For example, identifier module 104 may generate a first region-of-interest identifier by calculating region-of-interest hash 310 to represent beginning region 302 and end region 306 at a first time. The region of interest may include one or more regions of binary code, such as beginning region 302 and/or end region 306, where malware is most likely to infect the executable file. Malicious binary code may be inserted among legitimate binary code in the region of interest (e.g., beginning region 302 and/or end region 306) to infect the executable file.

Beginning region 302 may represent an entry point of binary code within the executable file. Conversely, end region 306 may represent an exit point of binary code within the executable file. For example, in an executable file that includes one megabyte of binary code, beginning region 302 may include the first ten kilobytes of binary code while end region 306 may include the last ten kilobytes of binary code. Beginning region 302 and end region 306 may also vary in size based on the size of the executable file.

A mid-region hash 312 may represent middle region 304 at a particular point in time. For example, identifier module 104 may generate a first mid-region identifier by calculating mid-region hash 312 to represent middle region 304 at a first time. Middle region 304 may include a region of binary code that is most likely to remain unmodified and unaffected by malware. In other words, middle region 304 may remain fully operable even after the region of interest has been modified and adversely affected by malware.

Figure 4:
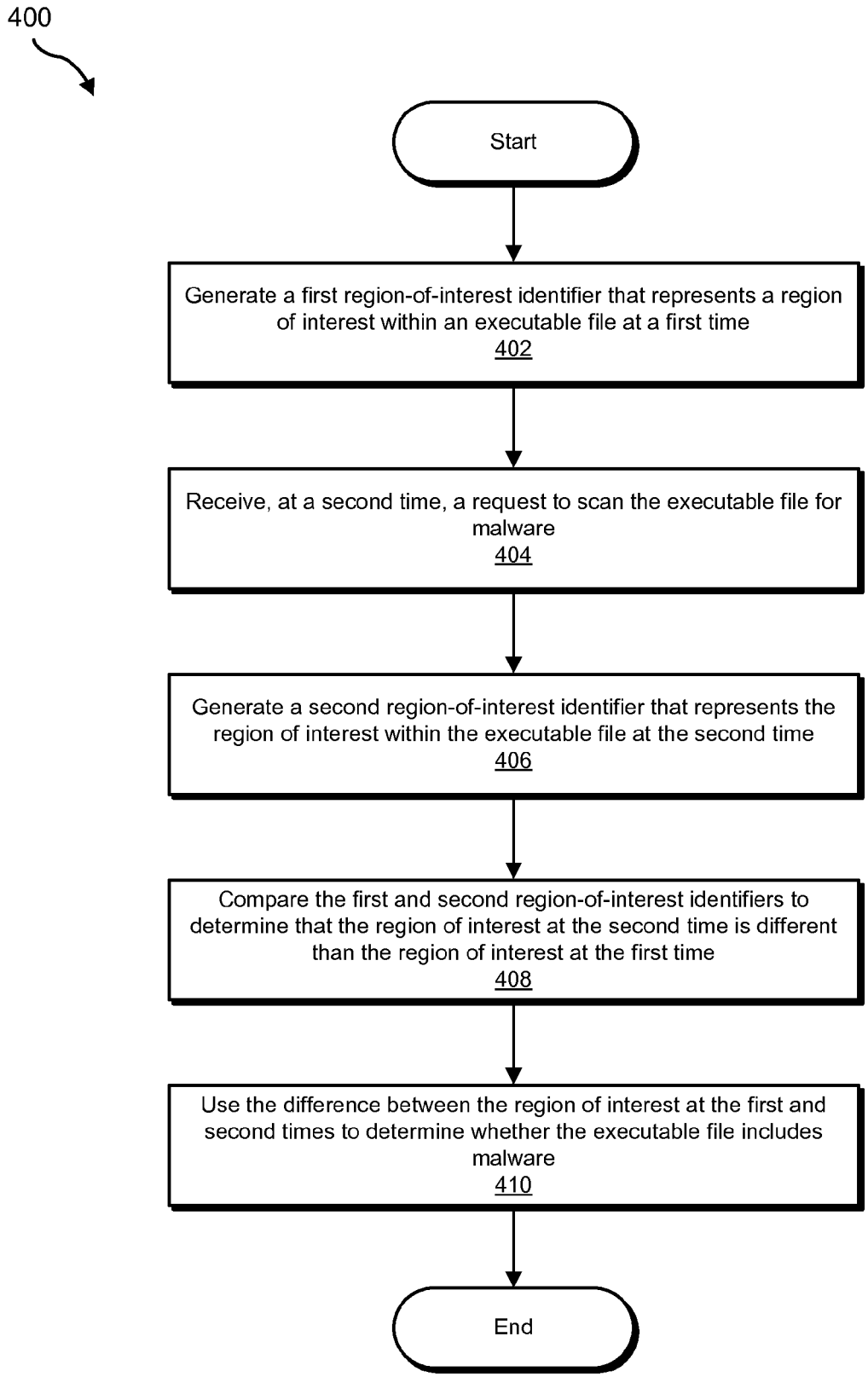
FIG. 4 is a flow diagram of an exemplary method for detecting unknown malware in an executable file.

FIG. 4 is a flow diagram of an exemplary computer-implemented method 400 for detecting unknown malware in an executable file. The steps shown in FIG. 4 may be performed by any suitable computer-executable code and/or computing system. In some embodiments, the steps shown in FIG. 4 may be performed by one or more of the components of system 100 in FIG. 1 and/or system 200 in FIG. 2. For example, at step 402, identifier module 104 may, as part of computing device 202, generate a first region-of-interest identifier that represents a region of interest within executable file 124(1) at a first time.

In certain embodiments, the region of interest may include one or more regions, such as a beginning region and/or an end region, where malware is most likely to infect executable file 124(1). For example, identifier module 104 may calculate a first region-of-interest hash that represents a beginning region and an end region of executable file 124(1) at a first time. Identifier module 104 may also store the first region-of-interest identifier as metadata 126(1), thereby enabling the first region-of-interest identifier to be retrieved for comparison with a second region-of-interest identifier at a second time.

The first region-of-interest identifier may be generated in any form of computer-readable data capable of representing the region of interest within executable file 124(1). Examples of computer-readable data that may be incorporated in the first region-of-interest identifier include, without limitation, hashes, fingerprints, checksums, digital signatures, compressed versions of the region of interest, or any other suitable types of computer-readable data.

In some embodiments, the first region-of-interest identifier may include a separate identifier for each individual region within the region of interest. For example, identifier module 104 may generate the first region-of-interest identifier by calculating both a beginning-region hash and an end-region hash at the first time. In this example, the beginning-region hash and the end-region hash may collectively represent the region of interest at the first time.

At step 404, malware-detection module 106 may receive, at a second time, a request to scan executable file 124(1) for malware. Step 404 may be performed in a variety of ways. For example, a user on computing device 202 may submit a request for an anti-malware solution, such as NORTON ANTIVIRUS, to scan at least a portion of file data store 122 for malware. Malware-detection module 106 may be part of the anti-malware solution and may receive the request and may, in response to the request, locate executable file 124(1) in file data store 122. File data store 122 may incorporate one or more portions of various storage devices, including those internal and external to computing device 202.

Figure 6:
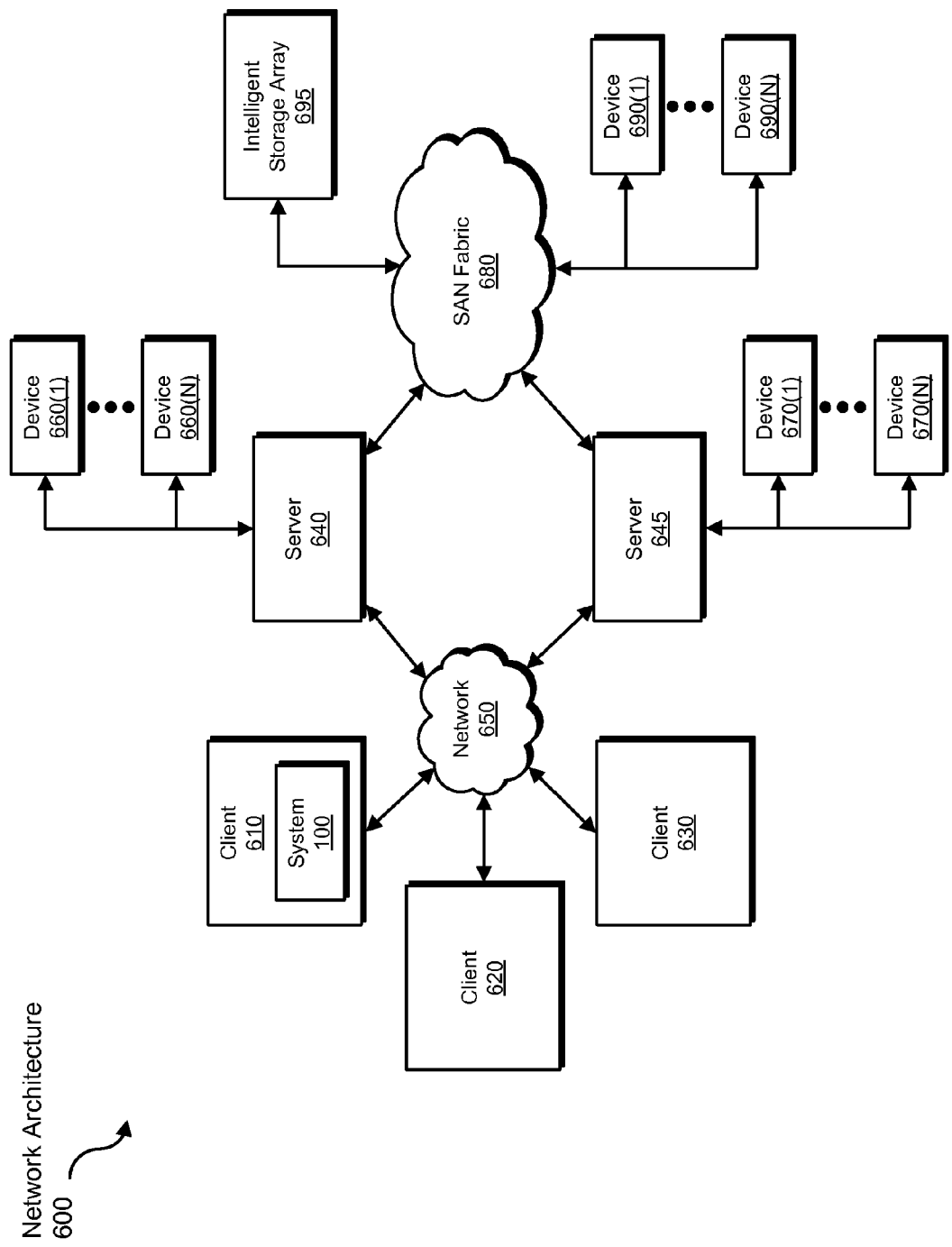
FIG. 6 is a block diagram of an exemplary computing network capable of implementing one or more of the embodiments described and/or illustrated herein.

In at least one embodiment, malware-detection module 106 may receive the request from another computing device over a network, such as an intranet, a Wide Area Network ("WAN"), a Local Area Network ("LAN"), the Internet, exemplary network architecture 600 in FIG. 6, or any other suitable network. Additionally or alternatively, the request may be any event occurring on computing device 202 that causes malware-detection module 106 to scan executable file 124(1) for malware.

At step 406, identifier module 104 may generate a second region-of-interest identifier that represents the region of interest within executable file 124(1) at the second time. For example, identifier module 104 may calculate a second region-of-interest hash that represents the beginning region and the end region of executable file 124(1) at the second time. The second region-of-interest identifier may be generated in any form of computer-readable data capable of representing the region of interest within executable file 124(1). Examples of computer-readable data that may be incorporated in the second region-of-interest identifier include, without limitation, hashes, fingerprints, checksums, digital signatures, compressed versions of the region of interest, or any other suitable types of computer-readable data.

In several embodiments, the second region-of-interest identifier may include a separate identifier for each individual region within the region of interest. For example, identifier module 104 may generate the second region-of-interest identifier by calculating both a beginning-region hash and an end-region hash at the second time. In this example, the beginning-region hash and the end-region hash may collectively represent the region of interest at the second time.

At step 408, malware-detection module 106 may compare the first and second region-of-interest identifiers to determine that the region of interest at the second time is different than the region of interest at the first time. In other words, malware-detection module 106 may determine that the region of interest has been modified since the first time. To compare the first and second identifiers, malware-detection module 106 may perform a binary differential on the first and second identifiers. For example, malware-detection module 106 may contrast each binary component of the first region-of-interest identifier with each corresponding binary component of the second region-of-interest identifier.

In some embodiments, malware-detection module 106 may determine, based on a result of the binary differential, that the region of interest has been modified since the first time. For example, malware-detection module 106 may determine that at least one binary component of the first region-of-interest identifier is different than at least one corresponding binary component of the second region-of-interest identifier. As a result, malware-detection module 106 may determine that the region of interest at the second time includes at least one executable instruction that has been modified since the first time or was not included in the region of interest at the first time.

At step 410, malware-detection module 106 may use the difference between the region of interest at the first and second times to determine whether executable file 124(1) includes malware 128(1). Step 410 may be performed in a variety of ways. For example, malware-detection module 106 may determine whether a middle region of executable file 124(1) has been modified, in addition to the region of interest, since the first time. To determine whether the middle region has been modified, identifier module 104 may generate a first mid-region identifier that represents the middle region of executable file 124(1) at the first time. Identifier module 104 may also store the first mid-region identifier as metadata of the executable file, thereby enabling the first mid-region identifier to be retrieved for comparison with a second mid-region identifier at a second time.

After malware-detection module 106 has determined that the region of interest has been modified, identifier module 104 may generate a second mid-region identifier that represents the middle region of executable file 124(1) at the second time. The middle region of executable file 124(1) may include a legitimate software program that remains unmodified and operable even if malware has infected the region of interest. The first and second mid-region identifiers may be generated in any form of computer-readable data, including those described above in connection with the first and second region-of-interest identifiers.

Malware-detection module 106 may compare the first and second mid-region identifiers to determine whether the middle region at the second time is different than the middle region at the first time. If both the middle region and the region of interest have been modified since the first time, malware-detection module 106 may determine that executable file 124(1) is not infected by malware. However, if the region of interest has been modified since the first time, but the middle region remains unmodified, malware-detection module 106 may determine that executable file 124(1) includes malware.

In some embodiments, the malware-detection module may determine whether executable file 124(1) includes malware by examining the region of interest at the second time. For example, malware-detection module 106 may determine whether at least one executable instruction in the region of interest is programmed to perform a suspicious action. Malware-detection module 106 may identify an executable instruction that is programmed to perform the suspicious action based on a variety of known malware behaviors.

In certain embodiments, malware-detection module 106 may locate, in the beginning region of executable file 124(1), at least one executable instruction that is programmed to perform a suspicious action. For example, malware-detection module 106 may identify, in the beginning region, an executable instruction that directs computing device 202 to suspiciously jump to, and execute, the end region of executable file 124(1). More specifically, malware-detection module 106 may identify, in the beginning region, a JMP instruction that directs computing device 202 to jump to, and execute, a portion of the end region that has been modified since the first time. Malware-detection module 106 may examine whether the portion of the end region further suggests, along with the JMP instruction in the beginning region, that executable file 124(1) includes malware 128(1).

In at least one embodiment, malware-detection module 106 may also locate, in the end region of executable file 124(1), at least one executable instruction that is programmed to perform a suspicious action. For example, malware-detection module 106 may identify, in the end region, an executable instruction that directs computing device 202 to suspiciously jump to, and execute, a middle region of executable file 124 (1). More specifically, malware-detection module 106 may identify, in the portion of the end region that has been modified since the first time, a JMP instruction that directs computing device 202 to jump back to, and execute, a portion of the middle region that remains unmodified since the first time. Malware-detection module 106 may examine whether the portion of the middle region further suggests, along with the JMP instruction in the end region, that executable file 124(1) includes malware 128(1).

In various embodiments, malware-detection module 106 may determine, based on the executable instructions, that executable file 124(1) includes malware 128(1). Upon determining that executable file 124(1) includes malware 128(1), malware-detection module 106 may perform one or more security actions with respect to executable file 124(1). For example, malware-detection module 106 may lower a reputation of executable file 124(1) and/or generate a notification to inform a user that executable file 124(1) includes malware 128(1). In addition, malware-detection module 106 may delete executable file 124(1) from computing device 202, quarantine executable file 124(1), and/or cure executable file 124(1) by removing malware 128(1).

Although not illustrated in FIG. 4, exemplary method 400 may include one or more additional steps. For example, in certain embodiments, before determining that the region of interest has been modified, malware-detection module 106 may examine executable file 124(1) as a whole. Malware-detection module 106 may determine, without comparing each of the individual regions within executable file 124(1), that at least a portion of executable file 124(1) has been modified since the first time.

To determine that the portion of executable file 124(1) has been modified, identifier module 104 may generate a first file identifier that represents executable file 124(1) at the first time. The first file identifier may represent the beginning region, the middle region, and the end region of executable file 124(1). After the request to scan executable file 124(1) for malware has been received, identifier module 104 may generate a second file identifier that represents executable file 124(1) at the second time. The first and second file identifiers may be generated in any form of computer-readable data, including those described above in connection with the first and second region-of-interest identifiers.

Malware-detection module 106 may then compare the first and second file identifiers before comparing the first and second region-of-interest identifiers. By starting with the first and second file identifiers, malware-detection module 106 may determine, without comparing each of the individual regions within executable file 124(1), that at least a portion of executable file 124(1) has been modified. Upon determining that the portion of executable file 124(1) has been modified, malware-detection module 106 may proceed to compare the first and second region-of-interest identifiers.

In some embodiments, identifier module 104 may perform a first scan of executable files 124(1)-(4). For example, during a first scan on computing device 202, identifier module 104 may search file data store 122 to locate and identify each of executable files 124(1)-(4) at the first time. As part of the first scan, identifier module 104 may generate a first region-of-interest identifier, a first mid-region identifier, and/or a first file identifier for each of executable files 124(1)-(4).

Identifier module 104 may store the first region-of-interest identifiers, the first mid-region identifiers, and/or the first file identifiers as metadata 126(1)-(4). These identifiers may be stored by any software program capable of managing metadata of executable files 124(1)-(4). In one example, a software program, such as SYMEFA, may store the first region-of-interest identifiers, the first mid-region identifiers, and the first file identifiers as file attributes for executable files 124 (1)-(4).

In at least one embodiment, identifier module 104 may perform a second scan of executable files 124(1)-(4). For example, during a second scan on computing device 202, identifier module 104 may search file data store 122 to locate and identify each of executable files 124(1)-(4) at the second time. As part of the second scan, identifier module 104 may generate a second region-of-interest identifier, a second mid-region identifier, and/or a second file identifier for each of executable files 124(1)-(4). Malware-detection module 106 may then retrieve one or more of the identifiers stored as metadata 126(1)-(4) to compare the identifiers that were generated at the first time with corresponding identifiers that were generated at the second time.

The first and second scans may also include performing one or more additional steps on each of executable files 124 (1)-(4). More specifically, malware-detection module 106 may perform one or more of the steps described above in connection with executable file 124(1) to determine whether each of executable files 124(2)-(4) also includes malware.

In certain embodiments, executable file 124(1) may be transformed by one or more modifications between the first and second times. These modifications may be introduced by a variety of different sources. For example, executable file 124(1) may include self-modifying code that introduces one or more modifications to executable file 124(1). In another example, a malware programmer may illegitimately access computing device 202 and insert one or more modifications into executable file 124(1). By identifying and examining these modifications, malware-detection module 106 may determine whether executable file 124(1) includes malware 128(1).

Figure 5:
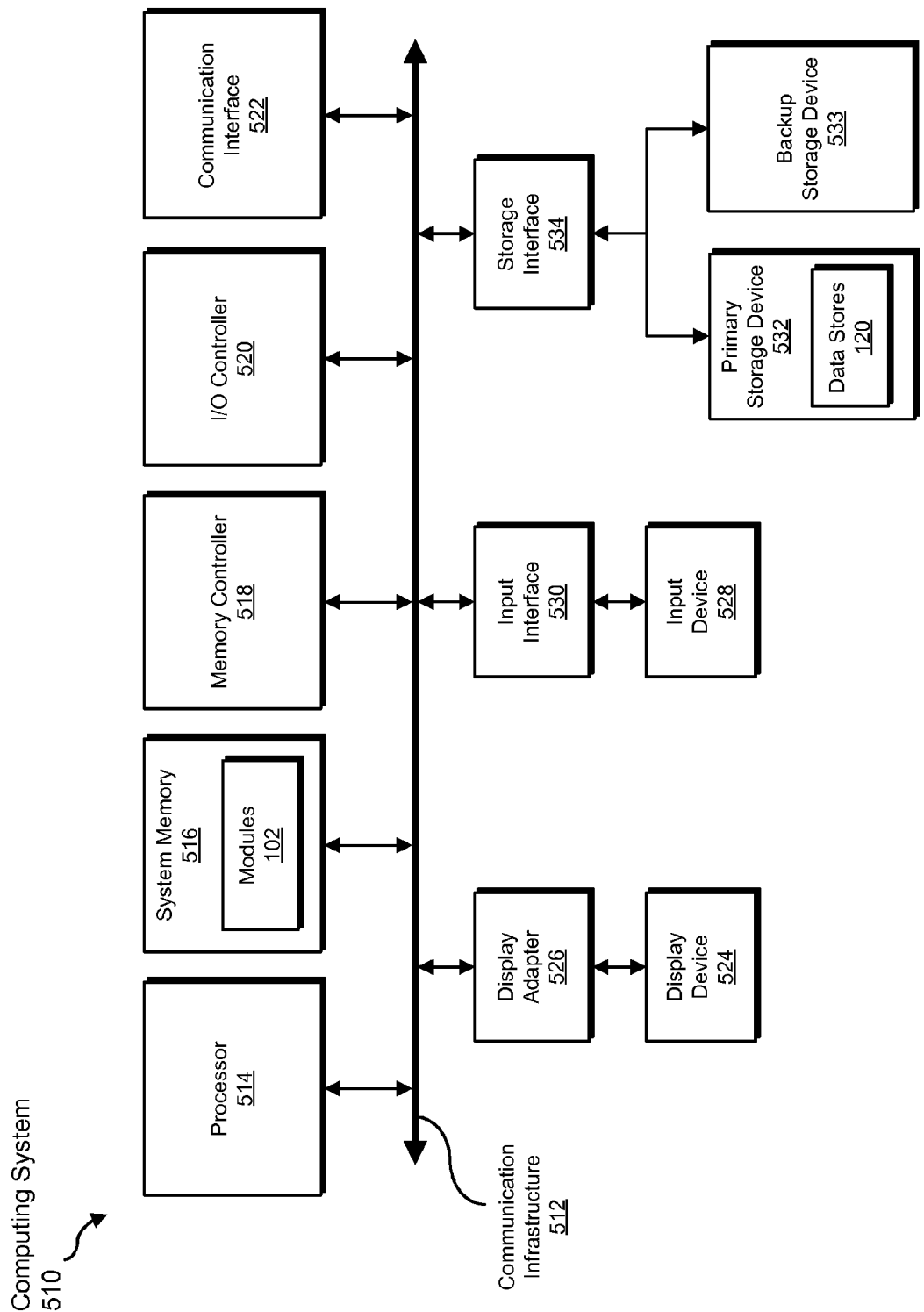
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein. For example, processor 514 may perform and/or be a means for performing, either alone or in combination with other elements, one or more of the generating, receiving, comparing, using, storing, performing, determining, calculating, lowering, curing, quarantining, and deleting steps described herein. Processor 514 may also perform and/or be a means for performing any other steps, methods, or processes described and/or illustrated herein.

System memory 516 generally represents any type or form of volatile or non-volatile storage device or medium capable of storing data and/or other computer-readable instructions. Examples of system memory 516 include, without limitation, random access memory (RAM), read only memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an ISA, PCI, PCIe, or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512. In certain embodiments, memory controller may perform and/or be a means for performing, either alone or in combination with other elements, one or more of the steps or features described and/or illustrated herein, such as generating, receiving, comparing, using, storing, performing, determining, calculating, lowering, curing, quarantining, and deleting.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534. I/O controller 520 may be used, for example, to perform and/or be a means for performing, either alone or in combination with other elements, one or more of the generating, receiving, comparing, using, storing, performing, determining, calculating, lowering, curing, quarantining, and deleting steps described herein. I/O controller 520 may also be used to perform and/or be a means for performing other steps and features set forth in the instant disclosure.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution. In certain embodiments, communication interface 522 may perform and/or be a means for performing, either alone or in combination with other elements, one or more of the generating, receiving, comparing, using, storing, performing, determining, calculating, lowering, curing, quarantining, and deleting steps disclosed herein. Communication interface 522 may also be used to perform and/or be a means for performing other steps and features set forth in the instant disclosure.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device. In at least one embodiment, input device 528 may perform and/or be a means for performing, either alone or in combination with other elements, one or more of the generating, receiving, comparing, using, storing, performing, determining, calculating, lowering, curing, quarantining, and deleting steps disclosed herein. Input device 528 may also be used to perform and/or be a means for performing other steps and features set forth in the instant disclosure.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a floppy disk drive, a magnetic tape drive, an optical disk drive, a flash drive, or the like. Storage interface 534 generally represents any type or form of interface or device for transferring data between storage devices 532 and 533 and other components of computing system 510. In one example, data stores 120 from FIG. 1 may be stored in primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

In certain embodiments, storage devices 532 and 533 may be used, for example, to perform and/or be a means for performing, either alone or in combination with other elements, one or more of the generating, receiving, comparing, using, storing, performing, determining, calculating, lowering, curing, quarantining, and deleting steps disclosed herein. Storage devices 532 and 533 may also be used to perform and/or be a means for performing other steps and features set forth in the instant disclosure.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an application specific integrated circuit (ASIC) adapted to implement one or more of the exemplary embodiments disclosed herein.

FIG. 6 is a block diagram of an exemplary network architecture 600 in which client systems 610, 620, and 630 and servers 640 and 645 may be coupled to a network 650. Client systems 610, 620, and 630 generally represent any type or form of computing device or system, such as exemplary computing system 510 in FIG. 5. In one example, client system 610 may include system 100 from FIG. 1.

Similarly, servers 640 and 645 generally represent computing devices or systems, such as application servers or database servers, configured to provide various database services and/or run certain software applications. Network 650 generally represents any telecommunication or computer network including, for example, an intranet, a wide area network (WAN), a local area network (LAN), a personal area network (PAN), or the Internet.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent network-attached storage (NAS) devices configured to communicate with servers 640 and 645 using various protocols, such as NFS, SMB, or CIFS.

Servers 640 and 645 may also be connected to a storage area network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650. Accordingly, network architecture 600 may perform and/or be a means for performing, either alone or in combination with other elements, one or more of the generating, receiving, comparing, using, storing, performing, determining, calculating, lowering, curing, quarantining, and deleting steps disclosed herein. Network architecture 600 may also be used to perform and/or be a means for performing other steps and features set forth in the instant disclosure.

As detailed above, computing system 510 and/or one or more components of network architecture 600 may perform and/or be a means for performing, either alone or in combination with other elements, one or more steps of an exemplary method for detecting unknown malware in an executable file.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of modules 102 in FIG. 1 may transform a property or characteristic of computing device 202 in FIG. 2 by performing a security action on executable file 124(1) in file data store 122.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for detecting unknown malware in an executable file, at least a portion of the method being performed by a computing device comprising at least one processor, the method comprising:
    generating a first region-of-interest identifier that represents a region of interest within the executable file at a first time;
    receiving, at a second time, a request to scan the executable file for malware;
    generating a second region-of-interest identifier that represents the region of interest within the executable file at the second time;
    comparing the first and second region-of-interest identifiers to determine that the region of interest at the second time is different than the region of interest at the first time by performing a binary differential on the first and second identifiers and determining, based on the result of the binary differential, that the region of interest at the second time includes at least one executable instruction that has been modified since the first time or was not included in the region of interest at the first time;
    using the difference between the region of interest at the first and second times to determine whether the executable file comprises malware by determining whether the executable instruction is programmed to perform a suspicious action that suggests the executable file comprises malware.

2. The method of claim 1, further comprising storing the first region-of-interest identifier as metadata of the executable file.

3. The method of claim 1, further comprising:
    generating a first file identifier that represents the executable file at the first time;
    generating a second file identifier that represents the executable file at the second time;
    comparing the first and second file identifiers to determine that at least a portion of the executable file has been modified since the first time.

4. The method of claim 1, wherein the region of interest comprises at least one of:
    a beginning region of the executable file;
    an end region of the executable file.

5. The method of claim 1, wherein using the difference between the region of interest at the first and second times to determine whether the executable file comprises malware comprises:
    generating a first mid-region identifier that represents a middle region of the executable file at the first time;
    generating a second mid-region identifier that represents the middle region of the executable file at the second time;
    comparing the first and second mid-region identifiers to determine whether the middle region of the executable file has been modified since the first time.

6. The method of claim 1, wherein
    performing the binary differential on the first and second identifiers comprises contrasting each binary component of the first region-of-interest identifier with each corresponding binary component of the second region-of-interest identifier.

7. The method of claim 1, wherein determining whether the executable instruction is programmed to perform a suspicious action that suggests the executable file comprises malware comprises determining that the executable instruction comprises a jump instruction that jumps to executable code that has been modified since the first time.

8. The method of claim 1, wherein generating the first and second region-of-interest identifiers comprises:
    calculating a first region-of-interest hash that represents the region of interest at the first time;
    calculating a second region-of-interest hash that represents the region of interest at the second time.

9. The method of claim 1, further comprising:
    determining that the executable file comprises malware;
    performing a security action with respect to the executable file.

10. The method of claim 9, wherein the security action comprises at least one of:
    lowering a reputation of the executable file upon determining that the executable file comprises malware;
    generating a notification to inform a user that the executable file comprises malware;
    curing the executable file by removing the malware from the executable file;
    quarantining the executable file;
    deleting the executable file.

11. The method of claim 1, further comprising:
performing a first scan of a plurality of executable files to identify the executable file at the first time;
performing a second scan of the plurality of executable files to identify the executable file at the second time.

12. A system for detecting unknown malware within an executable file, the system comprising:
at least one processor;
an identifier module programmed to direct the processor to:
generate a first region-of-interest identifier that represents a region of interest within the executable file at a first time;
generate a second region-of-interest identifier that represents the region of interest within the executable file at a second time;
a malware-detection module programmed to direct the processor to:
receive, at the second time, a request to scan the executable file for malware;
compare the first and second region-of-interest identifiers to determine that the region of interest at the second time is different than the region of interest at the first time by performing a binary differential on the first and second identifiers and determining, based on the result of the binary differential, that the region of interest at the second time includes at least one executable instruction that has been modified since the first time or was not included in the region of interest at the first time;
use the difference between the region of interest at the first and second times to determine whether the executable file comprises malware by determining whether the executable instruction is programmed to perform a suspicious action that suggests the executable file comprises malware.

13. The system of claim 12, wherein the identifier module is programmed to direct the processor to store the first region-of-interest identifier as metadata of the executable file.

14. The system of claim 12, wherein:
the identifier module is programmed to direct the processor to:
generate a first file identifier that represents the executable file at the first time;
generate a second file identifier that represents the executable file at the second time;
the malware-detection module is programmed to direct the processor to compare the first and second file identifiers to determine that at least a portion of the executable file has been modified since the first time.

15. The system of claim 12, wherein the identifier module is programmed to direct the processor to identify, as the region of interest, at least one of:
a beginning region of the executable file;
an end region of the executable file.

16. The system of claim 12, wherein:
the identifier module is programmed to direct the processor to:
generate a first mid-region identifier that represents a middle region of executable file at the first time;
generate a second mid-region identifier that represents the middle region of the executable file at the second time;
the malware-detection module is programmed to direct the processor to compare the first and second mid-region identifiers to determine whether the middle region of the executable file has been modified since the first time.

17. The system of claim 12, wherein the malware-detection module is programmed to direct the processor to
perform the binary differential on the first and second identifiers by contrasting each binary component of the first region-of-interest identifier with each corresponding binary component of the second region-of-interest identifier.

18. The system of claim 12, wherein the malware-detection module is programmed to determine whether the executable instruction is programmed to perform a suspicious action that suggests the executable file comprises malware by determining that the executable instruction comprises a jump instruction that jumps to executable code that has been modified since the first time.

19. The system of claim 12, wherein the malware-detection module is programmed to:
determine that the executable file comprises malware;
perform a security action with respect to the executable file.

20. A non-transitory computer-readable medium comprising one or more computer-executable instructions that, when executed by a computing device, cause the computing device to:
generate a first region-of-interest identifier that represents a region of interest within an executable file at a first time;
receive, at a second time, a request to scan the executable file for malware;
generate a second region-of-interest identifier that represents the region of interest within the executable file at the second time;
compare the first and second region-of-interest identifiers to determine that the region of interest at the second time is different than the region of interest at the first time by performing a binary differential on the first and second identifiers and determining, based on the result of the binary differential, that the region of interest at the second time includes at least one executable instruction that has been modified since the first time or was not included in the region of interest at the first time;
use the difference between the region of interest at the first and second times to determine whether the executable file comprises malware.

* * * * *